United States Patent [19]

Kasuga et al.

[11] Patent Number: 4,579,935

[45] Date of Patent: Apr. 1, 1986

[54] METHOD FOR MANUFACTURING POLYMER OR COPOLYMER OF TRIOXANE

[75] Inventors: Takuzo Kasuga, Tokyo; Takeshi Asano, Shizuoka; Yukio Ikenaga, Shizuoka; Masami Yamawaki, Shizuoka; Yasuyuki Takeda, Shizuoka; Koichi Ichimura, Shizuoka, all of Japan

[73] Assignee: Polyplastics Co., Ltd., Osaka, Japan

[21] Appl. No.: 723,727

[22] Filed: Apr. 17, 1985

Related U.S. Application Data

[63] Continuation of Ser. No. 618,612, Jun. 8, 1984.

[30] Foreign Application Priority Data

Jun. 8, 1983 [JP]   Japan ................................ 58-102500

[51] Int. Cl.$^4$ ................................................ C08G 2/10
[52] U.S. Cl. .................................... 528/232; 528/240; 528/241
[58] Field of Search .................. 528/232, 240, 241; 525/398

[56] References Cited

U.S. PATENT DOCUMENTS

| | | |
|---|---|---|
| 3,210,322 | 10/1965 | Polly et al. ................... 528/241 X |
| 3,218,296 | 11/1985 | Sidi . |
| 3,293,218 | 12/1966 | Sidi . |
| 3,382,293 | 5/1968 | Price ................................ 525/398 |
| 4,380,620 | 4/1983 | Matsuzaki et al. . |

Primary Examiner—Lucille M. Phynes

[57] ABSTRACT

The polymer or a copolymer of trioxane copolymer is manufactured by adding 0.001 to 2.0 wt. % of a stereo-hindering phenol to the monomer mixture in advance to the polymerization step and polymerizing trioxane and an optional co-monomer in the presence of a cationic, active catalyst and said phenol.

3 Claims, No Drawings

METHOD FOR MANUFACTURING POLYMER OR COPOLYMER OF TRIOXANE

This application is a continuation of application Ser. No. 618,612, filed June 8, 1984.

The present invention relates to an improved method of manufacturing polymers or copolymers of trioxane by polymerizing trioxane or copolymerizing trioxane as the main ingredient with other comonomers which are copolymerizable with trioxane.

Although a method of manufacturing polyacetals by polymerizing trioxane or copolymerizing trioxane with cyclic ethers or cyclic formals such as ethylene oxide in the presence of cation-active catalyzers such as boron trifluoride is known and practically used in the industry, since such polymerization reactions or copolymerization reactions gradually change liquid monomers to solid lumps with the progress of polymerization, this method has such disadvantageous that polymers and copolymers are apt to decompose in the subsequent processes such as the separation of non-reacted monomers, the washing of the resulting polymers or copolymers and the drying of the washed polymers or copolymers and as a result the products of the constant quality can not be obtained in addition to such disadvantages that the temperature of the reaction system can be more difficultly controlled with the progress of polymerization reaction and the temperature distribution of polymerization reaction system is wanting in homogeneity whereby unstabilizing the reaction and as a result the depolymerization reaction is produced to reduce the polymerization yield and further the principal chains are decomposed to remarkably reduce the molecular weight of the resulting polymers or copolymers. Although various kinds of polymerization apparatus aiming at a uniform temperature distribution have been proposed in order to solve the above described disadvantages, all of them are insufficient yet.

The inventors found it from their earnest investigation aiming at the solution of the above described disadvantages that the reduction of yield owing to the depolymerization during the polymerization, the reduction of molecular weight owing to the cutting of the principal chains and other undesirable by-reactions are controlled and the decomposition of the resulting reaction products in the subsequent processes such as the separation of non-reacted monomers by heating and evaporating them after polymerization, the separation of monomers by washing and the drying of polymerization products or copolymerization products is controlled by preliminarily adding stereo-obstructing phenols, which are usually used as antioxidant, to a polymerization system prior to a polymerization reaction to uniformly disperse them in the polymerization system since stereo-obstructing phenols are uniformly dispersed in the resulting reaction products. The present invention was achieved on the basis of this knowledge.

That is to say, the substance of the present invention is a method of manufacturing polymers and copolymers of trioxane by polymerizing trioxane or copolymerizing trioxane with comonomers, which are copolymerizable with trioxane, in the presence of cation-active catalyzers, characterized by that stereo-obstructing phenols are preliminarily added to monomers prior to the polymerization at a ratio of 0.001 to 2.0% by weight based on the total amount of monomers and the polymerization or the copolymerization is carried out in the presence of said stereo-obstructing phenols.

According to the present invention, stereo-obstructing phenols are added to monomers prior to the polymerization. It is known that polymers can be stabilized by adding stereo-obstructing phenols, which are antioxidants, to once polymerized polymers, melting the resulting mixture and blending it. Also polyacetal resins, which are industrially being manufactured at present, are compositions to which stereo-obstructing phenols are added as the stabilizer. However, in these cases, stereo-obstructing phenols are added at least after a polymerization reaction was finished. In most cases, they are added to solid polymers after non-reacted monomers were separated. The preliminary addition of stereo-obstructing phenols to monomers prior to the polymerization and the polymerization in the presence of stereo-obstructing phenols, which are disclosed in the present invention, has never been attempted since everybody knows that stereo-obstructing phenols have some ill effects on the polymerization reaction. It was, however, found from the result of the tests in which the specified amount of stereo-obstructing phenols was added to monomers prior to the polymerization that not only stereo-obstructing phenols did not have an ill effect on the polymerization reaction at all unexpectedly but also the depolymerization during the polymerization reaction was controlled to increase the yield of polymerization and the cutting of the principal chains was controlled to increase the molecular weight of polymers, too, by the addition of such substances. In addition, as for the reaction products obtained by polymerizing monomers containing stereo-obstructing phenols, undesirable decomposition reactions such as the reduction of molecular weight owing to the cutting of the principal chains of polymers were controlled in the subsequent processes such as the process in which the polymerization product was heated under the reduced pressure or the normal pressure in the stream of nitrogen or air to evaporate and separate residual monomers and the process in which the polymerization product was rinsed with water or organic solvents to separate monomers and then it was heated to dry in comparison with not only the reaction products obtained by polymerizing monomers without stereo-obstructing phenols but also the conventional reaction products obtained by adding stereo-obstructing phenols after the polymerization since stereo-obstructing phenols were uniformly dispersed in polymers, whereby leading to the products of stable quality even under considerably severe conditions.

Said stereo-obstructing phenols are generally known as antioxidants or free radical inhibitors. At least one of 2,2'-methylenebis(4-methyl-6-t-butylphenol), hexamethyleneglycolbis(3,5-di-t-butyl-4-hydroxyhydrocinnamate), tetrakis[methylene(3,5-di-t-butyl-4-hydroxyhydrocinnamate)]methane, triethyleneglycol-bis-3-(3-t-butyl-4-hydroxy-5-methylphenyl)propionate, 1,3,5-trimethyl-2,4,6-tris(3,5-di-t-butyl-4-hydroxy-benzyl)-benzen,p-octadecyl-3-(4'-hydroxy-3',5'-di-t-butyl-phenol)propionate, 4,4'-methylenebis(2,6-di-t-butyl-phenol), 4,4'-butylidene-bis-(6-t-butyl-3-methyl-phenol), 2,2'-thiodiethyl-bis-[3-(3,5-di-t-butyl-4-hydroxyphenol)]propionate, di-stearyl-3,5-di-t-butyl-4-hydroxybenzylphosphonate and 2-t-butyl-6-(3-t-butyl-5-methyl-2-hydroxybenzyl)-4-methylphenylacrylate may be used. However, said stereo-obstructing phenols are not limited to these compounds. All of other stereo-obstructing phenols of the same kind as the above described ones are effective. Of them, hexamethyleneglycol-bis(3,5-di-t-butyl-4-hydroxyhydrocinnamate), for example Ilganox 259 made by Ciba Geigy Ltd., tetrakis[methylene(3,5-di-t-butyl-4-hydroxyhydrocinnamate)]methane, for example Ilganox 1010 made by Ciba Geigy Ltd. and triethyleneglycol-bis-3-(3-t-butyl-4-hydroxy-5-methylphenyl)propionate, for example Ilganox 245 made by Ciba Geigy Ltd. are especially effective. On the other hand, the polymerization reaction did not occur and the effects, which are achieved by the method according to the present invention, could not be achieved when amines, amidines or other substances used as stabilizers for polyacetals were added to monomers.

Although a remarkably small amount of said stereo-obstructing phenols added to monomers prior to the polymerization is effective, in general said stereo-obstructing phenols are used at a ratio of 0.001 to 2.0, preferably 0.005 to 1.0% by weight based on the total amount of monomers. The effects are reduced as a matter of course if the amount of said stereo-obstructing phenols added is too small while the polymerization reaction is apt to be delayed to be undesirably uneconomical if the amount of said stereo-obstructing phenols is too large. Although a remarkably small amount in the above described range of said stereo-obstructing phenols is sufficient when the effects of only the polymerization reaction are expected, a comparatively large amount of said stereo-obstructing phenols may be added to monomers taking the matter that the polymers are post-treated to be merchandise and used under the still more severe conditions into consideration.

Said stereo-obstructing phenol can be added to monomers by dissolving them in monomers as they are or adding them in the form of their solution in a small amount of solvents inactive to the polymerization. In addition, in the continuous polymerization method the definite amount of said stereo-obstructing phenols is continuously fed to a monomer line of a polymerization apparatus and said stereo-obstructing phenols are sent to a polymerization apparatus in the form of their solution in monomers. Further, said stereo-obstructing phenols may be stored in the monomer tank in the form of their solution in monomers.

According to the present invention, every known cation-active catalyzer used usually in the polymerization of trioxane and the like may be used for polymerization catalyzers. Said polymerization catalyzers include Lewis acid, in particular halogenized compounds of boron, tin, titanium, phosphor, arsenic and antimony such as boron trifluoride, tin tetrachloride, titanium tetrachloride, phosphor pentachloride, phosphor pentafluoride, arsenic pentafluoride and antimony pentafluoride and its complex compounds or salts, esters of protonic acid such as esters of perchloric acid and protonic acid, in particular esters of perchloric acid and lower aliphatic alcohols such as perchloracid-t-butylester and protonic anhydride, in particular anhydrous mixtures of perchloric acid and lower aliphatic carbonic acids such as acetylpherchlorate, trimethyloxoniumhexafluorphosphate, triphenyl-methylhexafluorarsenate, acetyltetrafluorborate, acetylhexafluorphosphate and acetylhexafluoroarsenate. In particular, boron trifluoride, boron trifluoride-diethyletherate, boron trifluoride-di-p-butyletherate, triethyloxonium-tetrafluorborate and the like are preferably used.

According to the invention, the homopolymer of trioxane is obtained and in addition a copolymer of trioxane and another monomer which is copolymerizable with trioxane is also produced. Two or above kinds of co-monomers may be used. In the invention, the co-monomer(s) may be incorporated into the polymerization mixture in an amount of up to 25 wt.%, based on the total weight of the monomer mixture. Said co-monomer includes those which produce the polymers having branched structures or net-like structures in the molecule thereof. Said comonomers include cyclic ethers having the following general formula such as epichlorhydrin, ethylene oxide, 1,3-dioxolane, diethyleneglycolformal, 1,4-butanediolformal, 1,3-dioxane, 4-phenyldioxolane, propylene oxide and phenoxypropene oxide:

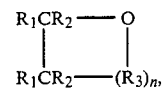

wherein $R_1$ and $R_2$ designate hydrogen or lower alkyl groups or lower alkyl groups displaced with halogens; $R_3$ designates methylene- or oxymethylene- or lower alkyl- or methylene-displaced with halogenized alkyl or oxymethylene groups displaced with halogenized alkyl; and n designates 0 to 3.

Also cyclic esters such as β-propiolactone and vinyl compounds such as styrene or acrylonitril can be used. In addition, said comonomers producing the polymers having branched structures or net-like structures include alkyl-mono (or di)-glycidylethers (or formals) such as methylglycidylformal, ethylglycidylformal, propylglycidylformal, butylglycidylformal, ethyleneglycoldiglycidylether, triethyleneglycoldiglycidylether and (1,2,6-hexanetriol)triformal.

Furthermore, as a matter of course the usual chain-shifters such as low molecular acetals can be used together with catalyzers and comonomers in order to regulate the molecular weight of the copolymers. The method according to the present invention has such an advantage that the molecular weight of the copolymers can be accurately regulated since the irregular decomposition reaction is controlled during or after the polymerization process.

The polymerization apparatus used in the present invention includes cokneaders, twin-screw type continuous extrusion mixers, twin-paddle type continuous mixers and other known trioxane-polymerization apparatus. Also the combination of polymerization apparatus of two kinds or more type can be used. It will be easily understood that the method according to the present invention is effective even when temperatures can be insufficiently regulated and it is still more effective in the prevention of deterioration in the case when the solid lumpy reaction products are treated for a considerably long time in order to increase the yield of the polymerization or the prevention of decomposition in the case when temperatures of the reaction mixture can be difficultly regulated in a large-sized polymerization apparatus.

Another characteristic of the present invention is in the effect in the post-treatment process after the completion of the polymerization reaction. That is to say, the decomposition and the reduction of the molecular weight of the polymerization reaction products obtained by the polymerization or the copolymerization in the presence of said stereo-obstructing phenols according to the present invention can be very effectively controlled not only in the case when said polymerization reaction products are heated at temperatures of 150° C. or less under the reduced pressure or the normal pressure but also in the case when they are treated at temperatures of 150° C. or less in the stream of nitrogen or air in order to evaporate (volatilize) and remove unreacted trioxane after once the polymerization was stopped by adding catalyzer-deactivators such as amines. Further, the deterioration of said polymerization reaction products such as the reduction of the molecular weight can be very effectively controlled also in the process when said polymerization reaction products are dried at temperatures of 150° C. or less to separate the polymers after they were treated with water or organic solvents containing said catalyzer-deactivators or their mixtures to rinse and separate unreacted monomers. Although it is desirable that these treatments including the separation of monomers, the rinsing of the resulting polymers or copolymers and the drying thereof are carried out at temperatures of 150° C. or less in order to prevent said polymerization reaction products being molten fused and lumped and further they are generally carried out at lower temperatures in order to more completely prevent the principal chains being cut, said post-treatment processes of the copolymers can be carried out at comparatively higher temperatures and simultaneously the unstable end portions of said copolymers can be separated and removed to stabilize said copolymers. In this case, according to the present invention, said post-treatment processes can be carried out under the more severe conditions of temperature and the kind of solvents in comparison with the case when said stereo-obstructing phenols are not contained in the reaction mixtures. It can be understood that this effect is the stabilizing effect of said stereo-obstructing phenols added to monomers prior to the polymerization owing to their uniform dispersion in the polymers not only in the polymerization process but also in the subsequent post-treatment processes. It was confirmed that said stereo-obstructing phenols were hardly dissolved in the rinsing solutions but remained in the polymers also in the post-treatment processes containing the rinsing process after the polymerization. Also it was confirmed that not only it was difficult to uniformly mix said stereo-obstructing phenols added to the polymers after the completion of the polymerization without adding said stereo-obstructing phenols but also it was impossible to uniformly disperse said stereo-obstructing phenols to the interior of solid polymers even though said stereo-obstructing phenols were added at a considerably large ratio. That is to say, although the addition of said stereo-obstructing phenols after the completion of polymerization exhibited the effect to some extent, such an effect was remarkably inferior to that of the method according to the present invention.

The preferred embodiments of the present invention will be described below but it goes without saying that the present invention is not limited to them. By the way, the terminology used in the Examples and Comparative Examples is as follows:

% or ppm is expressed by weight.

Yield of polymerization is expressed by a rate (% by weight) of the polymers, which are obtained after all post-treatment processes, to the total amount of monomers fed.

MI: Melt Index measured at 190° C. (g/10 min.) This was evaluated as a characteristic value corresponding to molecular weight. That is to say, the lower MI is, the higher molecular weight (the stabilizer is added at a ratio of about 1% in order to prevent the decomposition during measurement).

Alkali-decomposition rate: This rate is expressed by a rate (%) of the quantity of formaldehyde, which was dissolved in the solution after heating the copolymer of 1 g in 50%—aqueous solution of methanol of 100 ml containing ammonium hydroxide at a ratio of 0.5% at 180° C. for 45 min. in a closed vessel, to the quantity of the polymer.

Heating weight reduction rate: This rate is expressed by a weight reduction rate when the copolymer of 5 g smashed to pieces was sufficiently mixed with the stabilizer powders consisting of 2,2'-methylenebis(4-methyl-6-t-butylphenol) of 0.5% by weight and dicyandiamid of 0.1% and the resulting mixture was heated at 220° C. for 45 min.

EXAMPLE 1 AND COMPARATIVE EXAMPLE 1

Hexamethyleneglycol-bis(3,5-di-t-butyl-4-hydroxyhydrocinnamate) (Ilganox 259 made by Ciba Geigy Ltd.) is added to trioxane of 200 g put in a closed auto clave, which is provided with a jacket capable of passing heat medium therethrough and stirring blades, at a ratio of 0.01% and the mixture is stirred. Then the solution of boron trifluoride ethyletherate in cyclohexane (boron trifluoride of 40 ppm based on trioxane) is added to the mixture to start the polymerization with keeping the internal temperature of the auto clave of about 70° C. by passing hot water of 70° C. through the jacket. After 5 min., water of 300 g containing tributylamine at a ratio of 0.1% is added in the auto clave to stop the reaction. The content is taken out and smashed into pieces of 20 meshes or less. After rinsing with acetone the polymer was tested on the yield of polymerization and MI (EXAMPLE 1). On the other hand, the polymerization and treatments were carried out in the same manner as the above described without adding hexamethyleneglycol-bis(3,5-di-t-butyl-4-hydroxyhydrocinnamate) (COMPARATIVE EXAMPLE 1). The results are shown in Table 1.

TABLE 1

|  | Yield of polymerization | MI |
|---|---|---|
| EXAMPLE 1 | 85% | 5.4 |
| COMPARATIVE EXAMPLE 1 | 81% | 7.8 |

It is found from Table 1 that both higher yield of polymerization and higher molecular weight can be achieved when hexamethyleneglycol-bis(3,5-di-t-butyl-4-hydroxyhydrocinnamate) is added prior to the polymerization.

EXAMPLE 2 AND COMPARATIVE EXAMPLE 2

The treatments were carried out in the same manner as in EXAMPLE 1 excepting trioxane containing 1,3-dioxolane at a ratio of 4% is used as monomers instead of trioxane alone, boron trifluoride being added as the catalyzer at a ratio of 60 ppm, and hexamethyleneglycolbis(3,5-di-t-butyl-4-hydroxyhydrocinnamate) being added at a ratio of 0.8% (EXAMPLE 2). The treatments were carried out in the same manner as in EXAMPLE 2 without adding said stereo-obstructing phenols (COMPARATIVE EXAMPLE 2). The results are shown in Table 2.

TABLE 2

| | Yield of polymerization | MI | Alkali-decomposition rate | Heating weight reduction rate |
|---|---|---|---|---|
| EXAMPLE 2 | 68% | 5.2 | 3.8% | 3.2% |
| COMPARATIVE EXAMPLE 2 | 64% | 8.1 | 5.1% | 5.5% |

EXAMPLE 3 AND COMPARATIVE EXAMPLE 3

The copolymerization was carried out by continuously feeding trioxane containing ethylene oxide at a ratio of 2.5% and tetrakis[methylene(3,5-di-t-butyl-4-hydroxyhydrocinnamate)]methane (Ilganox 1010 manufactured by Ciba Geigy Ltd.) at a ratio of 0.05% at a rate of 10 kg/hr and simultaneously a solution of boron trifluoride-butyletherate in cyclohexane at a rate of boron trifluoride of 60 ppm based on the total quantity of monomers in a continuous mixing reactor of an effective length of 1.3 m consisting of a barrel provided with a jacket capable of passing heat medium therethrough on the outside thereof and two rotary axes engaging with each other and provided with a number of paddles on the inside thereof and having a section, in which two circles having a diameter of 80 mm are partially overlapped each other, through one end thereof with passing hot water of 80° C. through said jacket and rotating said two rotary axes in the directions, which are different to each other, at a speed of 100 rpm. The reaction mixture, which is discharged from another end of said continuous mixing reactor, was immediately put in water containing tributylamine at a ratio of 0.1%. The resulting mixture was stirred for 1 hour at 80° C. After the liquid phase had been removed the solid phase was dried at 135° C. for 2 hours (EXAMPLE 3). On the other hand, for the sake of comparison, the treatments were carried out in the same manner as in EXAMPLE 3 without adding tetrakis[methylene(3,5-di-t-butyl-4-hydroxyhydrocinnamate)]methane (COMPARATIVE EXAMPLE 3). The results are shown in Table 3.

TABLE 3

| | Yield of polymerization | MI | Alkali-decomposition rate | Heating weight reduction rate |
|---|---|---|---|---|
| EXAMPLE 3 | 71% | 4.6 | 1.9% | 1.7% |
| COMPARATIVE EXAMPLE 3 | 68% | 6.1 | 2.9% | 3.1% |

EXAMPLE 4 AND COMPARATIVE EXAMPLE 4

The polymerization reaction was carried out in the same manner as in EXAMPLE 3 and COMPARATIVE EXAMPLE 3, respectively and the polymerization reaction mixture discharged from the polymerization apparatus was immediately transferred into another reaction vessel, of which temperature was being kept 80° C., where the polymerization reaction was continued for further 10 min. and then the reaction mixture was put in water containing tributylamine at a ratio of 0.1%. The resulting polymerization products were washed, dehydrated and dried with air at 70° C. overnight. The results are shown in Table 4.

TABLE 4

| | Yield of polymerization | MI | Alkali-decomposition rate | Heating weight reduction rate |
|---|---|---|---|---|
| EXAMPLE 4 | 96% | 6.4 | 3.2% | 2.8% |
| COMPARATIVE EXAMPLE 4 | 92% | 9.1 | 5.1% | 5.3% |

EXAMPLE 5 AND COMPARATIVE EXAMPLE 5

The polymerization reaction mixture was mixed with a small quantity of a solution of tributylamine of 1% in cyclohexane and the mixture was kept under the condition of 90° C. and 200 to 300 mmHg until almost of nonreacted monomers were removed in place of EXAMPLE 4 and COMPARATIVE EXAMPLE 4 in which the polymerization reaction mixture was put in water. The results are shown in Table 5.

TABLE 5

| | Yield of polymerization | MI | Alkali-decomposition rate | Heating weight reduction rate |
|---|---|---|---|---|
| EXAMPLE 5 | 96% | 6.8 | 3.7% | 3.8% |
| COMPARATIVE EXAMPLE 5 | 93% | 9.5 | 6.8% | 6.1% |

Embodiments of the invention in which an exclusive property or privilege is claimed are defined as follows:

1. A method for manufacturing a polymer or copolymer of trioxane, which comprises the steps of adding 0.001 to 2.0 percent by weight, based on the total weight of the monomer of trioxane, of one or more of stereo-obstructing phenols to the reaction monomer in advance to the polymerization step, then polymerizing, or copolymerizing with another comonomer which is copolymerizable with trioxane, trioxane in the presence of said phenol(s) and a cationic, active catalyst and separating the resulting polymer or copolymer.

2. A method as claimed in claim 1, in which said phenol is selected from the group consisting of 2,2'-methylenebis(4-methyl-6-t-butylphenol), hexamethyleneglycolbis(3,5-di-t-butyl-4-hydroxyhydrocinnamate), tetrakis[methylene(3,5-di-t-butyl-4-hydroxyhydrocinnamate)]methane, triethyleneglycol-bis-3-(3-t-butyl-4-hydroxy-5-methylphenyl)propionate, 1,3,5-trimethyl-2,4,6-tris(3,5-di-t-butyl-4-hydroxy-benzyl)-benzen,p-octadecyl-3-(4'-hydroxy-3',5'-di-t-butylphenol)propionate, 4,4'-methylenebis(2,6-di-t-butylphenol), 4,4'-butylidene-bis-(6-t-butyl-3-methylphenol), 2,2'-thiodiethyl-bis-[3-(3,5-di-t-butyl-4-hydroxyphenyl)]propionate, di-stearyl-3,5-di-t-butyl-4-hydroxybenzylphosphonate and 2-t-butyl-6-(3-t-butyl-5-methyl-2-hydroxybenzyl)-4-methylphenylacrylate.

3. A method as claimed in claim 1 or 2, in which said comonomer is used in an amount of up to 25 percent by weight, based on the total weight of the monomer mixture.

* * * * *